Oct. 18, 1955          J. SINKO          2,721,096
WIND DEFLECTOR FOR THE WINDSHIELD OF AUTOMOBILES
Filed April 8, 1953
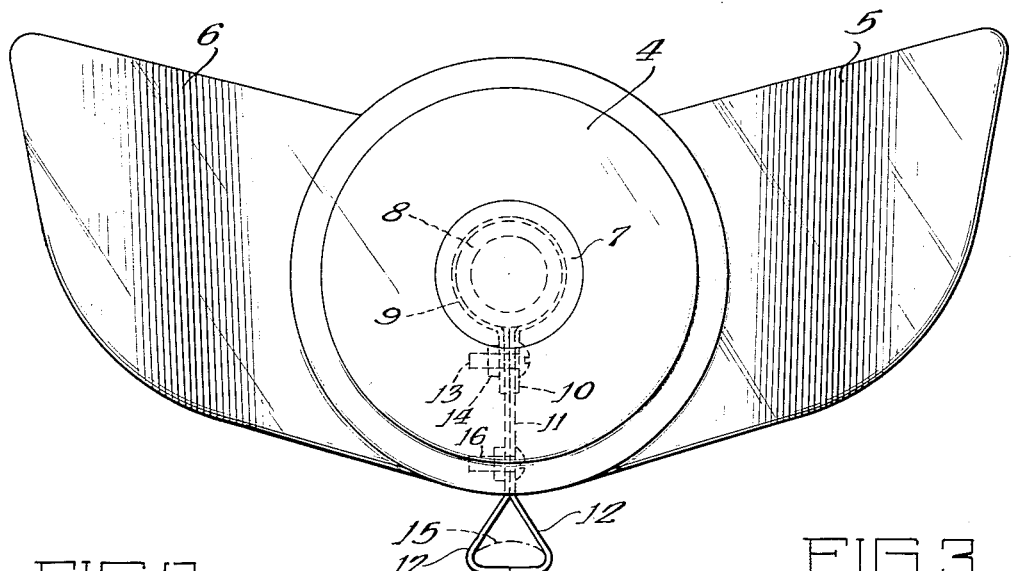
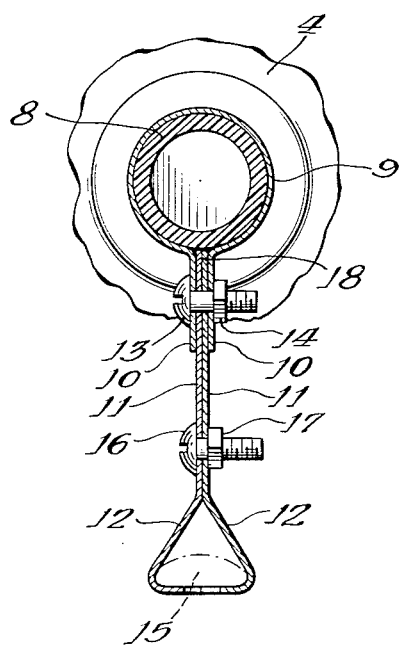
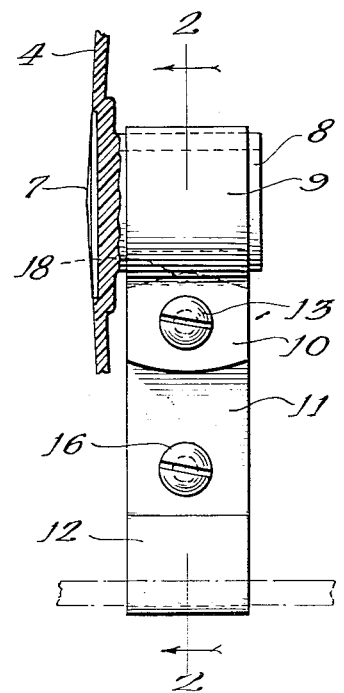
Inventor:
John Sinko
By: Schroeder, Merriam,
Hofgren & Brady
Attorneys

United States Patent Office 2,721,096
Patented Oct. 18, 1955

2,721,096

WIND DEFLECTOR FOR THE WINDSHIELD OF AUTOMOBILES

John Sinko, Chicago, Ill., assignor to Sinko Mfg. & Tool Co., a corporation of Illinois Application April 8, 1953, Serial No. 347,469

2 Claims. (Cl. 296—91)

This invention relates to wind deflectors for automobiles, and more particularly to deflectors to be placed on the hoods of automobiles to assist in directing insects, snow and rain in the air from striking the windshield during driving.

The primary object of the present invention is to provide an ornamental wind deflector which will effectively prevent insects encountered during driving from striking and lodging on the windshield of an automobile.

A further object is to provide a wind deflector which can be quickly and easily attached to the ornamental molding on automobile hoods.

Another object is to provide a wind deflector which can be supported, and is operative, in either upright or inverted position.

A further object is to provide a wind deflector which is braced by its supporting clamp when in upright, operative position.

The invention is illustrated in the preferred embodiment in the accompanying drawings, in which:

Fig. 1 is a front elevational view of the wind deflector;

Fig. 2 is a fragmentary sectional view of the wind deflector taken on line 2—2 of Fig. 3; and Fig. 3 is a fragmentary side elevational view of the wind deflector.

In the embodiment illustrated, the deflector portion 4, preferably of plastic, has integral wing-like extensions 5 and 6 which are usually convex as viewed from the front in Fig. 1. A decorative element 7, here shown as a thin circular sheet of shiny metal, may be secured to the deflector portion by some suitable adhesive for added ornamental effect.

An integral cylindrical shank 8, centrally disposed on the deflector, extends rearwardly and is embraced by a band 9 having downwardly extending arms 10. Arms 10 are secured to the upwardly extending arms 11 of a pair of opposed clamping jaws 12 by the bolt 13 and the nut 14. By tightening the nut 14 on the bolt 13, the band 9 is firmly held upon the shank 8.

The deflector 4 is secured to an automobile hood by the clamping jaws 12 which are drawn together to grip the central molding 15 on the hood by the bolt 16 and nut 17. The pair of shoulders 18 at the end of the arms 11 are arranged to bear closely against the lateral surface of the shank 8 to prevent the deflector from tipping when exposed to currents of air. Thus, even if the deflector portion 4 tends to pivot about the bolt 13, its movement is limited by the pair of shoulders 18, and the deflector is maintained upright.

Normally the wind deflector is mounted in the position shown in Fig. 1. However, it is equally well adapted to function in inverted position. The wing-like extensions 5 and 6 may be given a downward sweep by merely disengaging the clamping jaws 12 from the molding 15, rotating the deflector portion 180° about its shank, and replacing the device upon the molding.

The foregoing detailed description is given for clearness of understanding only, and no unnecessary limitations should be understood therefrom, for some modifications will be obvious to those skilled in the art.

I claim:

1. A wind deflector for automobiles comprising: a laterally-extending wing-like deflector portion having an integral, centrally disposed, rearwardly-extending cylindrical shank; and a supporting clamp gripping said shank and having a base portion at one end adapted to secure said deflector in upright position to a central molding of an automobile hood, said base portion having a shouldered portion on its other end in engagement with the cylindrical shank to hold said deflector in upright position.

2. A wind deflector for automobiles comprising: a laterally-extending wing-like deflector portion having an integral, centrally disposed, rearwardly-extending cylindrical shank; and a supporting clamp having a band embracing said shank, an upstanding base portion, and a fastener joining said band and base portion, said base portion having a pair of opposed jaws at one end to clamp the deflector to an ornamental hood molding, the opposite end of said base portion being apertured to receive said fastener to draw the ends of said band tightly about said shank, said opposite end extending above said fastener and providing a shoulder in engagement longitudinally of the shank when said band is drawn tight to prevent tipping of said deflector portion.

References Cited in the file of this patent

UNITED STATES PATENTS

| | | |
|---|---|---|
| 585,518 | Hamm et al. | June 29, 1897 |
| 1,290,252 | Lester et al. | Jan. 7, 1919 |
| 1,690,491 | Knauff | June 6, 1927 |
| 2,515,604 | Kish | July 18, 1950 |